May 12, 1931.  C. J. NASH  1,804,475
RAILWAY BRAKE
Filed Aug. 31, 1928  2 Sheets-Sheet 1
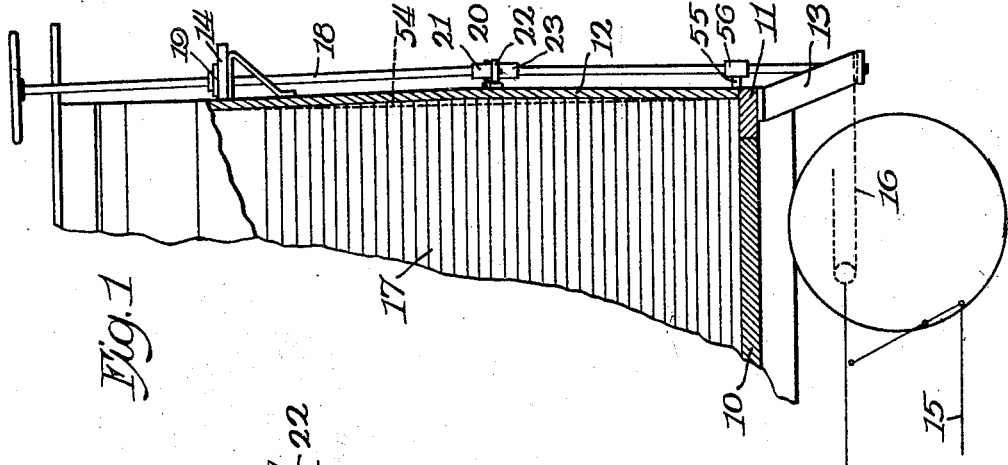
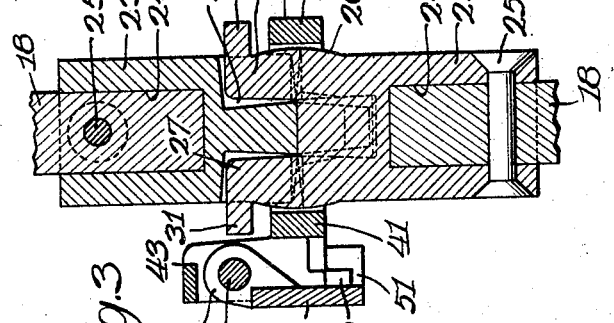
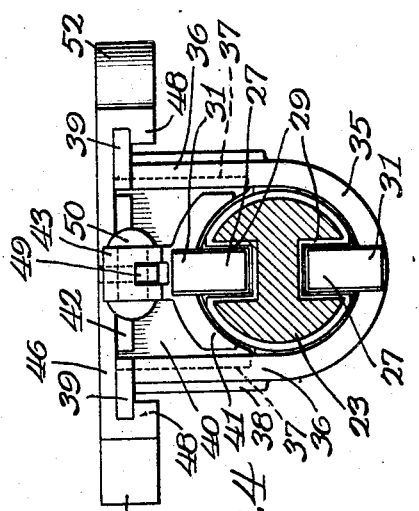
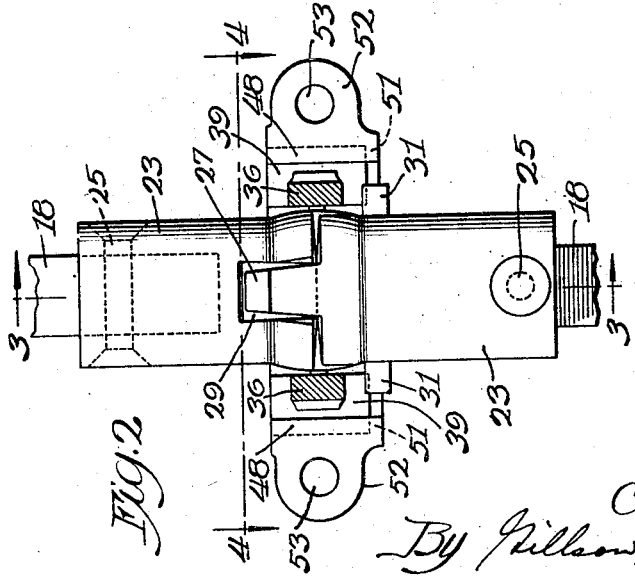
Inventor
Charles J. Nash
By Gillson, Munn & Cox, Attys.

May 12, 1931.  C. J. NASH  1,804,475
RAILWAY BRAKE
Filed Aug. 31, 1928   2 Sheets-Sheet 2
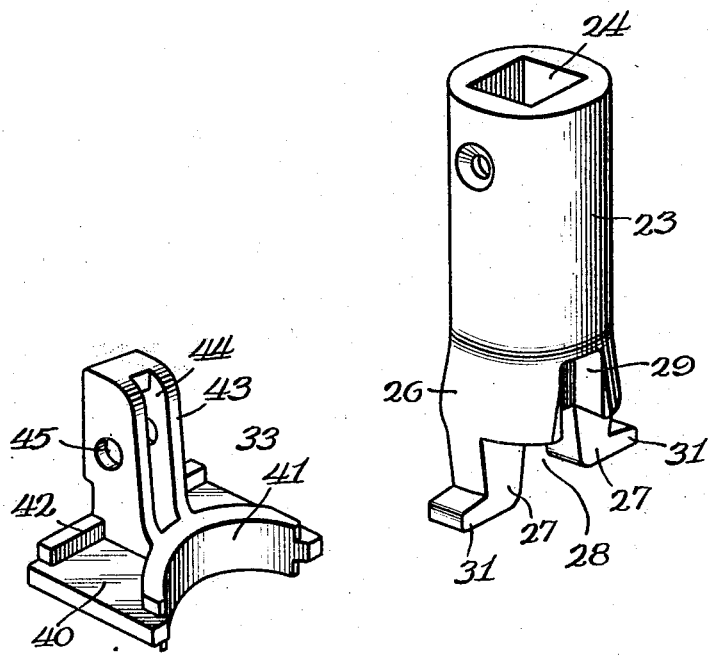
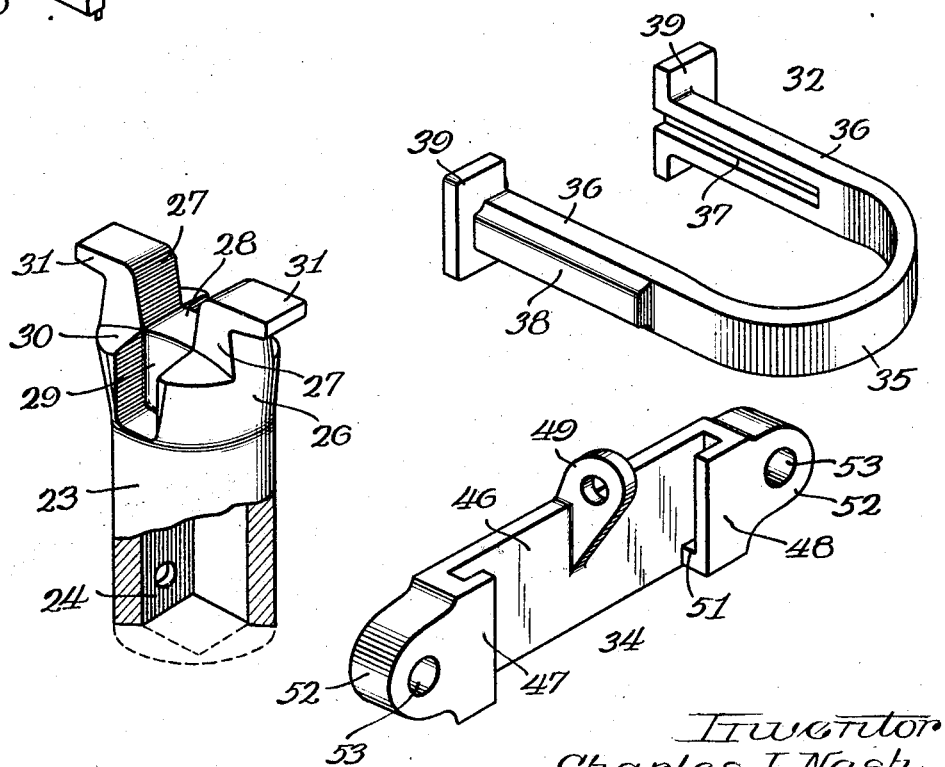
Fig.5
Inventor
Charles J. Nash
By Dillson, Mann & Cox
Attys.

Patented May 12, 1931

1,804,475

UNITED STATES PATENT OFFICE

CHARLES J. NASH, OF CHICAGO, ILLINOIS, ASSIGNOR TO UNIVERSAL DRAFT GEAR ATTACHMENT CO., A CORPORATION OF ILLINOIS

RAILWAY BRAKE

Application filed August 31, 1928. Serial No. 303,221.

In conventional freight car constructions the brake shaft is journaled at the bottom in a brake shaft step and near the top in a bearing supported on the car end. When the car end is distorted by the lading it frequently bears on the intermediate portion of the shaft making it bind, thereby decreasing the efficiency of the hand brake and interfering with the proper release of the brakes after a hand brake application.

The principal object of this invention is to eliminate this defect, and the preferred embodiment is illustrated in the accompanying drawings, in which Fig. 1 is a somewhat diagrammatical sectional view through a fragment of one end of a car;

Fig. 2 is an enlarged side elevation of an intermediate portion of the brake shaft and its bearing, a part of the latter being broken away;

Figs. 3 and 4 are vertical and transverse sectional views taken on the lines 3—3 and 4—4 respectively of Fig. 2, and Fig. 5 is a perspective view in which the parts of the universal joint and the bearing have been slightly separated to more clearly show the details of construction, and indicate generally the manner of assembly.

But neither this specific illustration nor the correspondingly specific description are to be understood as imposing limitations for they are used for the purpose of disclosure only and it is realized that the substance of the invention may be embodied in many other forms.

As the construction of the underframe 10, end sill 11, car end 12, brake shaft step 13, brake step 14, foundation brake gear 15 and hand brake 16, varies greatly in different cars, these parts are here shown more or less diagrammatically along with an assumed lading of lumber 17.

The brake shaft generally indicated by 18 is journaled at the bottom in the brake shaft step 13 and near the top in a bearing 19 carried by the step 14. In conventional practice this shaft is a continuous bar, either round or square. For this embodiment a squared bar has been selected.

According to the invention the shaft is severed at a point generally indicated by 20, which lies in the region where the maximum distortion of the car end may be expected, and the ends thus produced are connected by a universal joint generally indicated at 21, which is journaled in a bearing generally indicated at 22.

The universal joint includes two duplicate coupling members 23 of general cylindrical form each having at one end a squared socket 24 extending lengthwise to receive the corresponding end of a section of the shaft 18, which is made fast by a rivet 25.

Adjacent to the opposite end the coupling member is slightly enlarged at 26, and beyond that is provided with a fork including two arms 27, spaced apart by a crotch 28, adapted to be straddled by the fork of the cooperating coupling member.

At each side of the crotch 28 the enlargement is cut away at 29 to provide recesses of somewhat greater dimensions than the arms 27, and adapted to receive these arms, as best illustrated in Figs. 2 and 3, and permit the limited movement corresponding to the range of deflection in the joint.

On each side of each recess 29 there is a rounded shoulder 30, adapted to bear against and roll on a corresponding shoulder on the other coupling member.

The free end of each arm 27 is turned laterally and outwardly to provide a lug 31, the four of which cooperate with the bearing to limit lengthwise separation of the coupling members in use. The bearing includes a bow, generally indicated at 32 (Fig. 5), a crosshead generally indicated at 33, and a yoke generally indicated at 34 in that figure.

The bow includes the rounded part 35, substantially a semi-circle, from which straight arms 36 extend in parallel relation, each being provided on the inner side with a groove 37 and on the outside with a corresponding rib 38, and each terminating in laterally projected lugs 39, which may be termed feet.

The cross-head includes a web 40, adapted to slide into the grooves 37 and bring the curved flange 41 into cooperative relation with the curved portion 35 of the body to form a substantially cylindrical bearing for the shaft. At the rear of the web 40, in Fig. 5, there is a straight flange 42, adapted to rest on the intermediate portion of the yoke, as best illustrated in Fig. 4. The cross-head also includes an upwardly directed lug 43, as it appears in Fig. 5, which is split lengthwise, at 44, and perforated transversely at 45 to co-operate with a lug on the yoke and a key by which the parts are made fast.

The yoke includes a generally flat bar 46, having undercut shoulders 47 to receive and interlock with the lugs 39 of the body. At an intermediate portion it is provided with a perforated lug 49, adapted to be received within the slot 44 of the lug 43, and be fastened thereto by a key 50 (Fig. 3). A stop 51 on each of the undercut shoulders 48 cooperates with the lugs 39 to bring the perforations in the lugs 49 and 43 into register preparatory to inserting the key.

The yoke is provided with rounded ends 52, perforated at 53 to receive bolts by which it may be secured to the car end 12.

To assemble the two coupling members 23 are brought together with the fork of each astride the crotch of the other, the bow 32 is slipped over the joint thus formed between the two sets of lugs 31 on the arms of the forks, the cross-head 33 is slid into place, after which the yoke is engaged with the lugs 39 and secured by the key 50.

The sections of the shaft 18 may be secured to the coupling members either before or after the above operation.

The bearings in the brake shaft step 13 and in the brake step 14 are not fitted close, and it is obvious that when the car end bends outwardly the universal joint will permit the intermediate portion of the shaft to make a corresponding movement and yet preserve its operative condition.

In Fig. 1 the correct position of the inner surface of the car end is indicated by the line 54, and the corresponding deflection in the shaft illustrates how the invention permits adjustment to conditions of service.

In the conventional arrangement the brake shaft is provided with a bushing 56, cooperating with a one-sided bearing 55 carried by the end sill 11. The purpose of these parts is to support the shaft against the pull of the hand brake chain during a brake application. They may be retained in the embodiments of the present invention to serve this usual purpose, but in many instances they can also be omitted and thus effect a corresponding saving.

I claim as my invention:

1. In a car, a car end adapted to be deflected by the lading within the car, a brake shaft, extending along the car end and journaled in upper and lower bearings, said shaft including two sections and an intermediate universal joint and a third bearing connecting the universal joint and the car.

2. In a car, a car end, a brake shaft extending along the car end and including a universal joint, an intermediate bearing for the shaft adjacent to the universal joint and other bearings remote from said joint.

3. An article of manufacture including a pair of coupling members each having a fork astride the crotch of the other and each having sockets on the opposite sides adjacent to the crotch receiving the arms of the other, laterally extending lugs on each fork, and a bow member for engaging about said coupling members between the lugs on said members respectively for preventing separation of said members.

4. An article of manufacture including a pair of coupling members each having a fork astride the crotch of the other and each having sockets on the opposite sides adjacent to the crotch receiving the arms of the other, a laterally and outwardly directed lug on each arm of each fork and a bearing looped about the coupling members between the lugs.

5. An article of manufacture comprising a pair of coupling members each provided with longitudinal arms forming a fork astride the crotch between the arms of the other and having projections thereon, said crotches being adapted to contact at the axis of said members, and means embracing said joint and engaging said projections for preventing separation of said members.

6. An article of manufacture comprising a pair of coupling members each provided with longitudinal arms forming a fork astride the crotch between the arms of the other, and each provided with rounded shoulders on each side of each arm adapted to bear on the corresponding shoulders of the other, a bearing member extending about said coupling members, said bearing member being non-curved in cross-section, and means on said coupling members for engaging said bearing member for limiting the longitudinal movement of said coupling members relative to said bearing member.

7. An article of manufacture comprising a pair of coupling members each provided with longitudinal arms forming a fork astride the crotch between the arms of the other and each provided with rounded shoulders on each side of each arm adapted to bear on the corresponding shoulders of the other, a laterally and outwardly directed lug on each of said arms and a bearing cooperating with the lugs to limit longitudinal displacement of the coupling members.

8. An article of manufacture including a pair of coupling members each having a fork astride the crotch of the other and each having sockets on the opposite sides adjacent to the crotch receiving the arms of the other, a laterally and outwardly directed lug on each of said arms, and a bearing cooperating with the lugs to limit longitudinal displacement of the coupling members.

9. As an article of manufacture, a coupling member comprising a generally cylindrical portion having a socket in one end to receive a shaft, a fork including arms projecting lengthwise from the other end and spaced apart to form a crotch, there being a longitudinal recess in the coupling at each side of the crotch of greater dimensions than the arm, and shoulders on each side of the recesses approximately aligned with the crotch.

10. In an article of manufacture comprising a universal joint and a bearing for the joint including a bow having laterally projecting lugs at its ends, a cross-head interlocked with the arms of the bow and a yoke receiving the lugs on the bow.

11. In a car, a car end adapted to be deflected by the lading within the car, a brake shaft extending along the car end and journaled in upper and lower bearings, said shaft including two sections and an intermediate universal joint.

12. An article of manufacture comprising a pair of coupling members each provided with longitudinal arms forming a fork astride the crotch between the arms of the other and each provided with rounded shoulders on each side of each arm adapted to bear on the corresponding shoulders of the other, a laterally extending lug on each of said arms, and a bearing extending about said arms between the lugs on one set of arms and those on the other set of arms, and means for attaching said bearing to the end of a freight car.

In testimony whereof I affix my signature.

CHARLES J. NASH.